United States Patent [19]

Edris

[11] Patent Number: 4,843,513

[45] Date of Patent: Jun. 27, 1989

[54] METHOD AND ARRANGEMENT FOR PROTECTING TURBINE GENERATORS AGAINST SUBSYNCHRONOUS RESONANCES OCCURRING IN POWER TRANSMISSION SYSTEMS

[75] Inventor: Abdel-Aty O. M. Edris, Västers, Sweden

[73] Assignee: Asea Brown Boveri AB, Vasteras, Sweden

[21] Appl. No.: 174,164

[22] Filed: Mar. 28, 1988

[30] Foreign Application Priority Data

May 6, 1987 [SE] Sweden ................................ 8701860

[51] Int. Cl.$^4$ .............................................. H02H 7/06
[52] U.S. Cl. ........................................ 361/20; 361/58; 361/113; 361/107; 307/102; 307/105; 322/58
[58] Field of Search ..................... 361/20, 21, 51, 52, 361/53, 85, 107, 113, 111, 58; 307/102, 105; 322/7, 8, 58, 95, 96, 99, 100

[56] References Cited

U.S. PATENT DOCUMENTS

| | | | |
|---|---|---|---|
| 3,745,416 | 7/1973 | Thanawala | 361/58 |
| 3,813,593 | 5/1974 | Tice et al. | 322/58 |
| 3,881,137 | 4/1975 | Thanawala | 307/105 |
| 4,158,864 | 6/1979 | Kennon | 361/58 |
| 4,355,241 | 10/1982 | Hingorani | 307/102 |
| 4,434,376 | 2/1984 | Hingorani | 307/102 |
| 4,551,780 | 11/1985 | Canay | 361/113 |
| 4,724,333 | 2/1988 | Hedin | 307/102 |

FOREIGN PATENT DOCUMENTS 687932  6/1964  Canada ............................... 307/105

Primary Examiner—A. D. Pellinen
Assistant Examiner—H. L. Williams
Attorney, Agent, or Firm—Watson, Cole, Grindle & Watson

[57] ABSTRACT

A method by which a turbine generator (1, 2, 3) can be protected against sub-synchronous frequencies occurring in an electric network which is connected to the turbine generator and which incorporates capacitors. The method is based on de-equalizing the subsynchronous natural frequencies of the three phases, so as to weaken the coherence of the frequencies. This is achieved by incorporating in each of two of the phases a respective inductance L of mutually different size and by changing the capacitance equivalently with a series capacitance C such as to fulfill the condition $1/LC = \omega_o^2$, where $\omega_o$ is the network frequency.

12 Claims, 2 Drawing Sheets

METHOD AND ARRANGEMENT FOR PROTECTING TURBINE GENERATORS AGAINST SUBSYNCHRONOUS RESONANCES OCCURRING IN POWER TRANSMISSION SYSTEMS

BACKGROUND OF THE INVENTION

1. Field of the Invention

The present invention is concerned with the problems of interaction occurring in power transmission systems which incorporate turbine generators.

By subsynchronous frequencies is meant frequencies which are below the system frequency, which may be, e.g. 50 Hz or 60 Hz, and which may be produced in power transmission networks when the networks are subjected to disturbances of varying kinds. These subsynchronous frequencies are very troublesome when turbine generators are connected to the network. This is associated with the fact that a turbine generator is comprises of a generator and several fast rotating turbines (e.g. high pressure turbines—first and second low pressure turbines) which are provided with shafts which together with the large rotating masses in turbines, generators and magnetizing rotors, are able to form oscillators on the basis of torsion oscillations in the shafts, with an often complicated array of resonance frequencies within the subsynchronous range. These mechanical resonance circuis are connected electrically direct to the network, through the generator.

This problem has become highly noticeable, particularly as a result of the series compensation with capacitors in long transmission lines and also particularly as a result of an increase in the degree of compensation, in that the amount of energy stored in the capacitor batteries is so large, this energy being available for the generation of subsynchronous resonances in the network in the event of a disturbance. Such a disturbance oscillation is coupled, through the generator, directly to the mechanical system of the turbine generator, which when the resonance frequencies are adapted to the resonance frequency of the network, will be caused to oscillate at such an amplitude as to result in possible damage to the shafts of said system.

2. Related Art

This problem has been the subject of various solutions, where attempts have been made to dampen the resonance oscillations by incorporating resistances in the power transmission lines.

In the case of one such damping system described and illustrated in Swedish Published Specification No. 8000104-3 (446.289) an ohmic resistance which is coupled in parallel with a series resonance circuit tuned to the system frequency is connected in series with each phase in the block transformer and/or generator of a turbogroup. These subsynchronous oscillation damping circuits may either be activated constantly or may be activated in response to the control of a disturbance sensor.

In the case of another system according to U.S.-A-4,434,376 or 4,355,241 a damping resistance in the network circuit is activated when a sensor detects a time distance between zero crossings which exceeds those normal for the network frequency, therewith indicating the presence of a subsynchronous resonance.

This known system is therefore often very expensive, especially when the system function requires the presence of sensors and switching means.

SUMMARY OF THE INVENTION

It is the object of the invention to provide an improved, simpler, and therewith less expensive, solution to the problem of subsynchronous oscillations in power transmission networks and their interaction with turbine generators which are sensitive to such perturbations or disturbances as a result of their principle construction.

The invention is based on the realization that it is possible to solve the problem by means other than the use of damping resistances in the electrical equipment of the two oscillatory systems. Thus, the invention is instead directed towards reducing the mutula coupling between the mechanical oscillatory systems in the turbine part and the externally lying electric oscillatory system.

In accordance with the invention, a change of this nature in the coupling conditions is achieved by making the various phases of the electrical transmission system mutually different for subsynchronous frequenies, by making modifications to the resonance frequencies of said phases, which modifications are mutually different while, at the same time, leaving the reactance of the phase lines at the system frequency unmodified and essentially at mutually the same value.

One way of achieving this is to include in a transmission line in series an inductance L which is connected in series with a capacitance C, where this pair of components fulfills the condition $1/LC = \omega_o^2$, where $\omega_o$ is the power frequency (the system frequency). At least one, or preferably two of the phase conductors of the transmission line are provided with mutually different pairs fulfilling this condition, which introduces mutual differences between the phases with respect to resonance oscillations at subsynchronous frequencies. Alternatively, instead of connecting a series-LC-circuit serially in each of two phases, each of the phases may be provided with a respective parallel-LC-circuit and optionally a resistance connected in series therewith parallel with the main capacitor or a part thereof, the parallel-LC-circuit being tuned to the mains frequency (system frequency) while the reactance (including the main capacitor or said part thereof) of the whole circuit is tuned to another frequency. By selecting other, mutually different frequencies for the two modified phases, an asymmetry is achieved at low frequencies while retaining symmetry at the mains frequency.

This will result in a marked reduction in the coupling between the mechanical oscillatory circuits of the turbine and the electrical oscillatory circuits in the line system, which is coupled to the turbine generator, since coherence between the frequencies in the phase conductors will be greatly disturbed.

Because the mutual coherence of the three phases for disturbance-engendered subsynchronous frequencies will be destroyed, each such frequency will then give rise to (appear as) a "single phase" current, and although these currents will admittedly be present in the generator coupled to the network, they will not be able to co-act in a manner to generate a net torque of any significance. It is true that the three frequencies will result in superposed currents in the generator, but seen from the point of view of an indicator diagram these currents can each be seen as two counter-rotational arrows of mutually equal size. The three superimposed currents will only exert appreciable torque, and then only momentarily, at those instances when they are mutually cooperating. It is therewith possible to avoid the situation of so-called negative damping (self-excitation) resulting from the so-called induction generator effect. This results in a particularly marked reduction in the stresses to which a turbine shaft connected to the generator is subjected. The transfer of energy from the mechanical resonator system to the electrical systems at subsynchronous frequencies will also be made more difficult. It can also be noted that breaking of the mutual connection of the mechanical and electrical oscillator systems in accordance with the invention is directed towards eliminating the known stability problems that can occur, when more than one turbine generator is connected to a network, in which case mutual oscillations and so-called negative damping can result in deleterious subsynchronous oscillations.

Although the proposed modification of phase conductors in accordance with the present invention is easiest to explain in the terms of a capacitor and in inductance which are connected in series, a capacitor can be connected in series with another capacitor with equal effect, by reducing the value of the series capacitor already found in the system. Since banks of series capacitors normally consist of a multiple of capacitors mutually connected in parallel, the capacitance value can be easily decreased, simply by eliminating some of the capacitors.

The invention can also be applied in a manner other than by the purely inclusion of separate inductances in the system. When constructing transmission lines it is normal to endeavor to achieve a balance between the three phases from the aspect of reactance, by transposition of the conductors and by the subsequent incorporation of inductances with the intention of achieving further symmetry. According to one aspect of the invention, there can be used intentionally instead an inductance of dissimilar value which is created by the particular pattern according to which the conductors are drawn, or alternatively mutually different conductor types etc. can be used, and a corresponding compensation for the dissimilarities in inductance can be made, by adjusting the values of the different capacitor banks, such as to compensate for the dissimilar inductive contributions with respect to the system frequency. Naturally, this use of the mutually dissimilar inductances of the phase conductors can be combined with the addition of inductance devices. The essential inventive effect is achieved in both cases. Similarly, the method by means of which the inventive asymmetry is achieved can also be applied with networks which lack intentionally incorporated series capacitors.

The advantages afforded by the invention and the distinctive features thereof are achieved by a method which comprises the procedural steps of: producing an impedance asymmetry in at least one, preferably two, of the phase conductors, such that an inductance and a capacitance corresponding thereto are arranged in such a way that the inductive contribution of the inductance with respect to the phase conductor concerned and to the system frequency of the power line is compensated by the capacitive contribution of the capacitance, so that all of the phase conductors will exhibit symmetrically substantially the same impedance value for the system frequency, and so that at least one of the phase conductors will exhibit a different impedance for other frequencies. According to one aspect of the invention, the method can be practiced with the aid of an arrangement which has the characteristic features of: an array of three capacitors in a respective phase conductor are of unlike size; and in that two of the phase conductors exhibit series inductances which are so dimensioned that the impedance formed by respective series capacitors and any existing series inductances at the system frequency of the power line network is the same for all of said phase conductors.

BRIEF DESCRIPTION OF THE DRAWINGS

The invention will now be described with reference to exemplifying embodiments thereof and with reference to the accompanying drawings, in which.

DETAILED DESCRIPTION OF THE INVENTION

Figure 1:
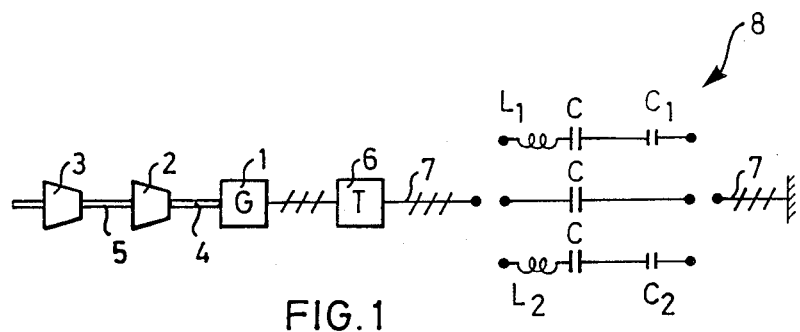
FIG. 1 illustrates a simplified circuit diagram for a schematically illustrated turbine generator.

FIG. 1 illustrates schematically a turbine generator comprising a generator 1 which has a transformer 6 and which is connected to a turbine having a low pressure part 2 and a high pressure part 3 which are interconnected by shafts 4 and 5. The rotating masses in the generator 1 and in the turbines 2 and 3 are coupled mechanically through shafts which are able to function as torsion shafts, resulting in the unavoidable occurrence of natural resonance frequencies, which may be relatively low. 8 represents the equivalent electrical network at point 7 of the power network.

In the case of prior art power lines, a series capacitor C is included in each phase conductor. As illustrated in, e.g., Swedish Published Specifaction No. 8000104-3, such a system has a resonance frequency $\omega_e$, to which the system can be quickly brought by perturbations, this frequency being in accordance with the following expression, $$\frac{\omega_e}{\omega_o} = \sqrt{\frac{X_C}{X_G + X_T + X_E}} = \sqrt{\frac{X_C}{X_N}}$$

where $\omega_o$=the system frequency (e.g. 50 Hz or 60 Hz)

$$X_C = \frac{1}{\omega_o C}$$

where C is the value of the equal-size series capacitances.

$X_G$=the generator reactance
$X_T$=the transformer short-circuiting reactance
$X_E$=the line reactance
$X_N = X_G + X_T + X_E$ In co-action with the network frequency, such a frequency $\omega_e$ may coincide, or nearly coincide, with the natural frequency $\omega_m$ of one of the turbines:

$$\omega_m = \omega_o - \omega_e$$

wherewith electrical oscillatory energy may be transferred, via the generator, to the mechanical torsion oscillatory system and therewith exert destructive torque or twist on the turbine shaft.

In accordance with the example, however, two of the phase conductors provided with series capacitors are each complemented with a respective series inductance $L_1$ and $L_2$ and with a respective series capacitor $C_1$ and $C_2$. These fulfill the subsidary conditions:

$$\left. \begin{array}{l} \omega_o L_1 = \dfrac{1}{\omega_o C_1} \\ \omega_o L_2 = \dfrac{1}{\omega_o C_2} \end{array} \right\}$$

The resonance frequency in these two lines is therewith changed from $\omega_e$ to $\omega_{e1}$ and $\omega_{e2}$ respectively. These changes can be expressed as:

$$\left(\frac{\omega_{e1}}{\omega_e}\right)^2 = \frac{1 + \dfrac{C}{C_1}}{1 + \left(\dfrac{\omega_e}{\omega_o}\right)^2 \dfrac{C}{C_1}}$$

$$\left(\frac{\omega_{e2}}{\omega_e}\right)^2 = \frac{1 + \dfrac{C}{C_2}}{1 + \left(\dfrac{\omega_e}{\omega_o}\right)^2 \dfrac{C}{C_2}}$$

Figure 2:
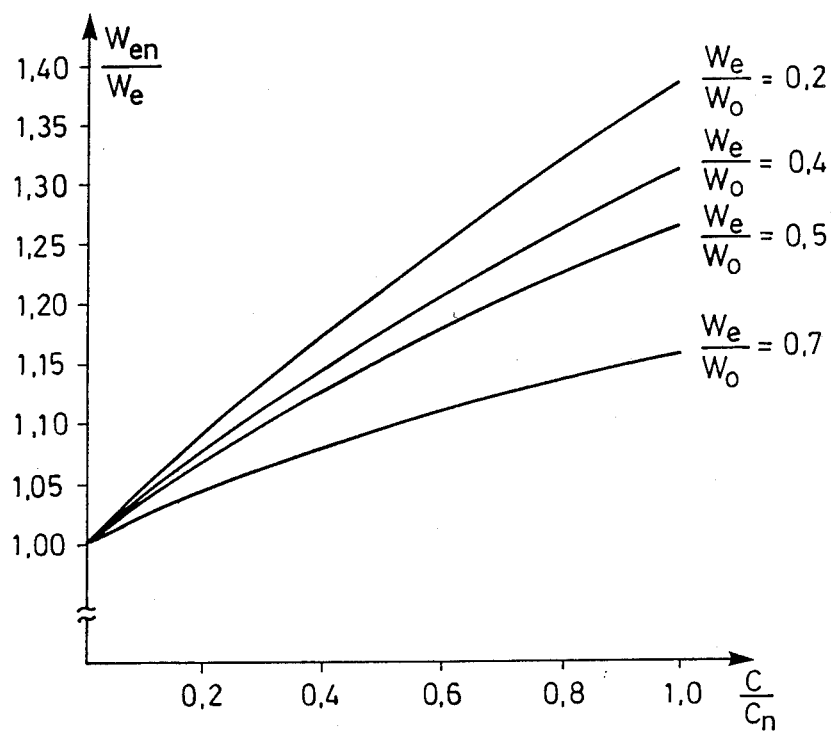
FIG. 2 illustrates a graph.

FIG. 2 illustrates curves for equal $\omega_e/\omega_o$, with $\omega_{en}/\omega_e$ as a function of $C/C_n$. (n=1 or 2).

The following example illustrates the possible result of a calculation.

EXAMPLE

Assume that $\omega_e/\omega_o = 0.4$ (a network characteristic). We wish to effect a frequency for two phases.

$$\frac{\omega_{e1}}{\omega_e} = 1.1$$

$$\frac{\omega_{e2}}{\omega_e} = 1.2$$

i.e. a phase change of 10% and 20%. Thus, it is found from the above expression and from the graph, that $C/C_1 = 0.25$ and $C/C_2 = 0.6$ in respective cases;

i.e $C_1 = 4\ C; \dfrac{1}{\omega_o C_1} = \dfrac{1}{4\omega_o C} = 0.25\ X_C$ $\omega_o L_1 = \dfrac{1}{\omega_o C_1}$ ; $\omega_o L_1 = -0.25\ X_C$ respectively $C_2 = 1.67\ C; \dfrac{1}{\omega_o C_1} = \dfrac{1}{1.67 \omega_o C} = 0.6\ X_C$ $\omega_o L_2 = \dfrac{1}{\omega_o C_2}$ ; $\omega_o L_2 = -0.6\ X_C$ Two series-connected capacitors, however, may equally as well be replaced with a single equivalent capacitor and the values $C_{eq1}$ and $C_{eq2}$ of the equivalent capacitors are obtained as $$C_{eq1} = \frac{CC_1}{C + C_1} = \frac{4CC}{5C} = 0.8\ C$$

$$C_{eq2} = \frac{CC_2}{C + C_1} = \frac{1.67CC}{2.67C} = 0.63\ C$$

Figure 3:
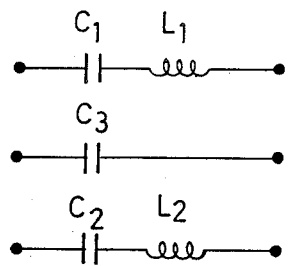
FIG. 3 illustrates a circuit diagram for one embodiment of the invention.

It will be seen that the invention can be best applied by decreasing the capacitor banks for two of the phases and by inserting a respective series inductance. The introduction of a series capacitor is thus equivalent to a reduction in the equivalent series as shown in FIG. 3 as compared to FIG. 1.

The magnitude of the frequency change will, of course, be adapted to prevailing circumstances. For example, the "mechanical oscillators" in steam and gas turbines have torsion elements which have small losses. Consequently, the oscillators will, in many cases, have a high Q value. On the other hand, the losses for subfrequency oscillations in the lines is so high as to result in significant damping. All of these frequency dependent phenomena are, in themselves, available for data simulation, when more knowledge is acquired of the various data of a given electric network, and the effect afforded by the invention can therefore be optimized readily by one skilled in this art, by suitable selection of the values which fall within the conditions required by the invention. It is necessary that the corrections, in each particular case, exceed the magnitude of the asymmetries which occur naturally as a result of standard tolerances (1-2%). For example, in order to achieve an effect of medium quality, the difference in series capacitance should suitably be at least 10%, although this will depend, of course, on how near the total system is to a resonance situation.

In the above exemplification of one method of application of the invention it has been assumed that a turbine generator is connected to a transmission line whose length is such as to require the provision of series-compensating capacitor banks in order to enhance the power transmission ability of the transmission line. It is possible, however, that the turbine generator is intented primarily for supplying electricity to a local consumer network which is also connected to a larger network. It is possible that the three-phase conductor which connects the turbine generator with the larger network has no series compensation and that the larger network incorporates at one or more locations reactive-effect-compensating capacitor banks, the stored energy of which can be released and therewith generate subsynchronous oscillations at amplitudes which are deleterious to the turbine generator. The invention can then be applied by inserting series connected capacitors and inductances in at least one phase conductor, preferably two phase conductors, in the connection between the local network, which incorporates the turbine generator, and the larger network, such as to achieve the inventive decoupling. It may suffice in many instances to create the asymmetry desired, by changing only one of the phase conductors and allowing the other two phase conductors to remain fully symmetrical.

Figure 4:
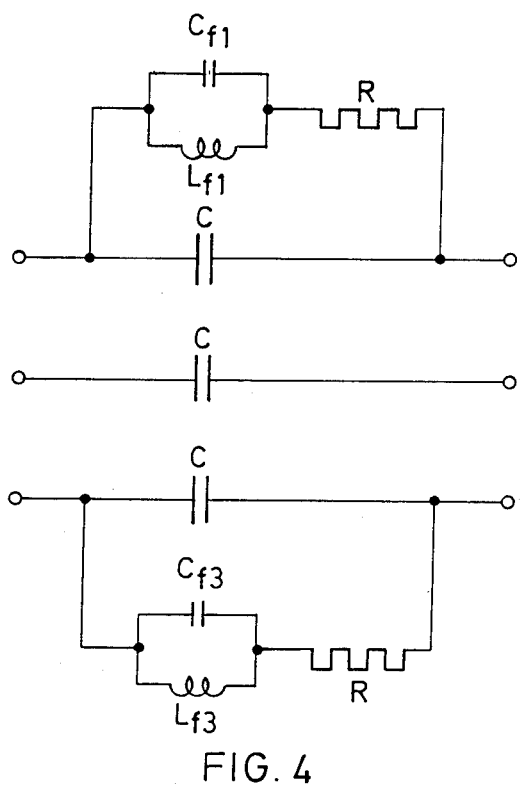
FIG. 4 illustrates a circuit diagram for another embodiment of the invention.

FIG. 4 illustrates another method of achieving the desired asymmetry for subsynchronous frequencies. In this embodiment, parallel-LC-circuits $L_{f1}\ C_{f1}$ and $L_{f3}\ C_{f3}$ are each connected in series with a respective resistance R which may be from 1 to 5 Ω, but which may also be omitted. These auxiliary circuits fulfill the condition $L_{f1}\ C_{f1} = L_{f3}\ C_{f3} = 1/\omega_o^2$, and hence will not influence the phases at system frequency. On the other hand, the resonance frequencies of all of the respective circuits, including the series capacitors C, are each tuned preferably to a mutually different frequency within the subsynchronous range.

It will be understood that the inventive asymmetry can, in principle, be achieved in many different ways which from the aspect of the invention must considered to be equivalent. The solution applied will, of course, depend upon the conditions which prevail in each individual case, for example on whether it is a matter of a new construction or the modification of existing transmission lines, etc. By reducing the coupling between the electrical and mechanical oscillatory systems, it is possible to maintain the possible transfer of oscillatory energy at a low level, in that a damped subsynchronous oscillation engendered by a perturbation or a disturbance will never have sufficient time to transfer sufficient oscillatory energy to the mechanical systems. The theory of coupled oscillations shows that in the case of low system damping there will be a total exchange of energy backwards and forwards between the systems, even when the coupling is weak, in which latter case the exchange of energy takes a longer time instead. The weakend coupling also reduces the risk of self-sustaining oscillation, caused by oscillatory energy generated in the generator at subsynchronous frequencies.

The invention thus achieves a reduction in the mechanical stresses caused by interaction between turbine and electric network. This does not solely apply to the case when single catastrophic occurrences are averted, but also to rendering unharmful a source of oscillations which would give rise to such stresses and which in time would result in fatigue phenomena. The likely long-term durability can thereby be increased to an extent which corresponds to that proportion of fatigue stresses which is contributed by the electrical system coupled to the turbine.

I claim:

1. A method for protecting a turbine generator connected to a three-phase power line network, comprising producing an impedance asymmetry in at least one, preferably two, of the phase conductors, such that an inductance and a capacitance corresponding thereto are arranged in such a way that the inductive contribution of the inductance with respect to the phase conductor concerned and to the system frequency of the power line is compensated by the capacitive contribution of the capacitance, so that all of said phase conductors will exhibit symmetrically substantially the same impedance value for the system frequency, and so that at least one of the phase conductors will exhibit an impedance different from said other phase conductors for other frequencies.

2. A method according to claim 1, further comprising modifying two phase conductors in mutually different ways.

3. A method according to claim 2 when carried into effect in a network in which the phase conductors incorporate series-connected capacities, wherein the series capacitance is changed by serially connecting a capacitance $C_n$, such that the series inductance will have the value $L_n$, and will fulfill the condition $$\omega_0 L_n = 1/\omega_0 C_n$$

where $\omega_o$ is the system frequency of the power line.

4. A method according to claim 2 which is carried into effect in a network in which the phase conductor incorporates series-connected capacitors, wherein the series inductance in one of the modified phases has the inductance value $L_n$ and a balancing series capacitor value $C_n$ determined by the expression:

$$C_n = 1/\omega_0^2 L_n$$

where $\omega_o$ is the system frequency of the power line, and in that the value of the series capacitor of the phase conductor is changed from C to $$C_{eq} = \frac{C_n C}{C_n + C}$$

5. A method according to claim 2 which is put into effect with networks in which capacitors are connected serially to the phase conductors, wherein at least one phase has connected thereto a parallel circuit of capacitance and inductance $C_{f1}$, $L_{f2}$ across the whole main capacitor of said at least one phase, such that $C_f = 1/\omega_O^2 L_f$, where $\omega_O$ is the system frequency.

6. A method according to claim 5, wherein two phases are ach provided with a respective parallel resonance circuit $C_{f1}$, $L_{f1}$ and $C_{f3}$, $L_{f3}$, the values of which are so selected that said phases exhibit mutually dissimilar impedance values at frequencies which deviate essentially from the system frequency.

7. A method according to claim 1 when carried into effect in a network in which the phase conductors incorporate series-connected capacitances, wherein the series capacitance is changed by serially connecting a capacitance of capcitance $C_n$, such that the series inductance will have the value $L_n$, and will fulfill the condition $$\omega_0 L_n = 1/\omega_o C_n$$

where $\omega_o$ is the system frequency of the power line.

8. A method according to claim 1 which is carried into effect in a network in which the phase conductor incorporates series-connected capacitors, wherein the series inductance in one of the modified phases has the inductance value $L_n$ and a balancing series capacitor value $C_n$ is determined by the expression $$C_n - 1/\omega_0^2 L_n$$

where $\omega_o$ is the system frequency of the power line, and in that the value of the series capacitor of the phase conductor is changed from C to $$C_{eq} = \frac{C_n C}{C_n + C}$$

9. A method according to claim 1 which is put into effect with networks in which capacitors are connected serially to the phase conductors, wherein at least one phase has connected thereto a parallel circuit of capacitance of inductance $C_{f1}$, $L_{f2}$ across the whole main capacitor of said at least one phase, such that $C_f = 1/\omega_O^2 L_f$, where $\omega_O$ is the system frequency.

10. A method according to claim 8, wherein two phases are each provided with a respective parallel resonance circuit $C_{f1}$, $L_{f1}$ and $C_{f3}$, $L_{f3}$, the values of which are so selected that said phases exhibit mutually dis-similar impedance values at frequencies which deviate essentially from the system frequency.

11. An arrangement for protecting a turbine generator which is connected to a three-phase power line network, the phase conductors of which incorporate serially connected capacitors, wherein an array of three capacitors in a respective phase conductor are of unlike size; and in that two of the phase conductors exhibit series inductances which are so dimensioned that the impedance formed by respective series capacitors and any existing series inductances at the system frequency of the power line network is the same for all of said phase conductors, and for other frequencies at least one phase conductor will exhibit an impedance different from said other phase conductors.

12. An arrangement for protecting a turbine generator which is connected to a three-phase power line network in which the phase conductors thereof incorporate series connected capacitors, wherein a parallel circuit comprising a capacitor and an inductance, which together fulfill the condition $1/LC = \omega_o^2$, is connected in parallel with one of the series connected capacitors or a part thereof, such that a system frequency, $W_o$, each of said phase conductors will exhibit the same impedance and at other frequencies, at least one of said phase conductors will exhibit an impedance different from said other phase conductors.

* * * * *